(12) United States Patent
Saito et al.

(10) Patent No.: US 7,325,525 B2
(45) Date of Patent: Feb. 5, 2008

(54) PISTON FOR INTERNAL COMBUSTION ENGINE

(75) Inventors: Haruhiko Saito, Toyota (JP); Tsutomu Sakai, Ueda (JP)

(73) Assignees: Toyota Jidosha Kabushiki Kaisha, Toyota (JP); Art Metal Mfg. Co., Ltd., Ueda (JP)

(*) Notice: Subject to any disclaimer, the term of this patent is extended or adjusted under 35 U.S.C. 154(b) by 0 days.

(21) Appl. No.: 11/362,103

(22) Filed: Feb. 27, 2006

(65) Prior Publication Data

US 2006/0207548 A1    Sep. 21, 2006

(30) Foreign Application Priority Data

Mar. 18, 2005   (JP)   ............... 2005-078295

(51) Int. Cl.
F02F 1/00    (2006.01)
F02B 5/00    (2006.01)

(52) U.S. Cl. .................... 123/193.6; 123/305

(58) Field of Classification Search .. 123/193.1–193.6, 123/305

See application file for complete search history.

(56) References Cited

U.S. PATENT DOCUMENTS

| 3,104,922 | A |   | 9/1963 | Baster | |
|---|---|---|---|---|---|
| 4,180,027 | A | * | 12/1979 | Taylor | 123/41.35 |
| 4,292,937 | A |   | 10/1981 | Vallaude | |
| 4,891,875 | A | * | 1/1990 | Soichi et al. | 29/888.046 |
| 4,986,167 | A | * | 1/1991 | Stratton et al. | 92/186 |
| RE34,139 | E | * | 12/1992 | Cooper et al. | 123/193.6 |
| 5,535,716 | A |   | 7/1996 | Sato et al. | |
| 5,934,174 | A | * | 8/1999 | Abraham et al. | 92/222 |
| 6,513,477 | B1 | * | 2/2003 | Gaiser et al. | 123/193.6 |
| 6,539,910 | B1 | * | 4/2003 | Gaiser et al. | 123/193.6 |
| 2002/0170531 | A1 | * | 11/2002 | Saito et al. | 123/295 |
| 2004/0129243 | A1 |   | 7/2004 | Robelet | |
| 2005/0087153 | A1 | * | 4/2005 | Moon | 123/41.35 |

FOREIGN PATENT DOCUMENTS

| EP | 1 443 200 A1 | 8/2004 |
|---|---|---|
| JP | A 2002-115549 | 4/2002 |
| JP | A 2002-317692 | 10/2002 |
| JP | A 2004-181534 | 7/2004 |
| JP | A 2004-211622 | 7/2004 |
| WO | WO 97/48895 A1 | 12/1997 |

* cited by examiner

Primary Examiner—John T. Kwon
(74) Attorney, Agent, or Firm—Oliff & Berridge, PLC

(57) ABSTRACT

A piston includes: in a cross-section that is perpendicular to a piston pin and that includes a center axis of the piston, a great thickness-reduction portion provided to attain a thin thickness as stress applied to the piston on a side without a cavity is small, and a small thickness-reduction portion provided to attain a thick thickness as stress applied to the piston on a side with the cavity is great; and in a cross-section that is perpendicular to the piston pin and that does not include a center axis of the piston, a great thickness-reduction portion provided on a side without the cavity to attain a thin thickness to achieve balance of the piston, and a small thickness-reduction portion provided on a side with the cavity.

6 Claims, 9 Drawing Sheets

F I G. 1
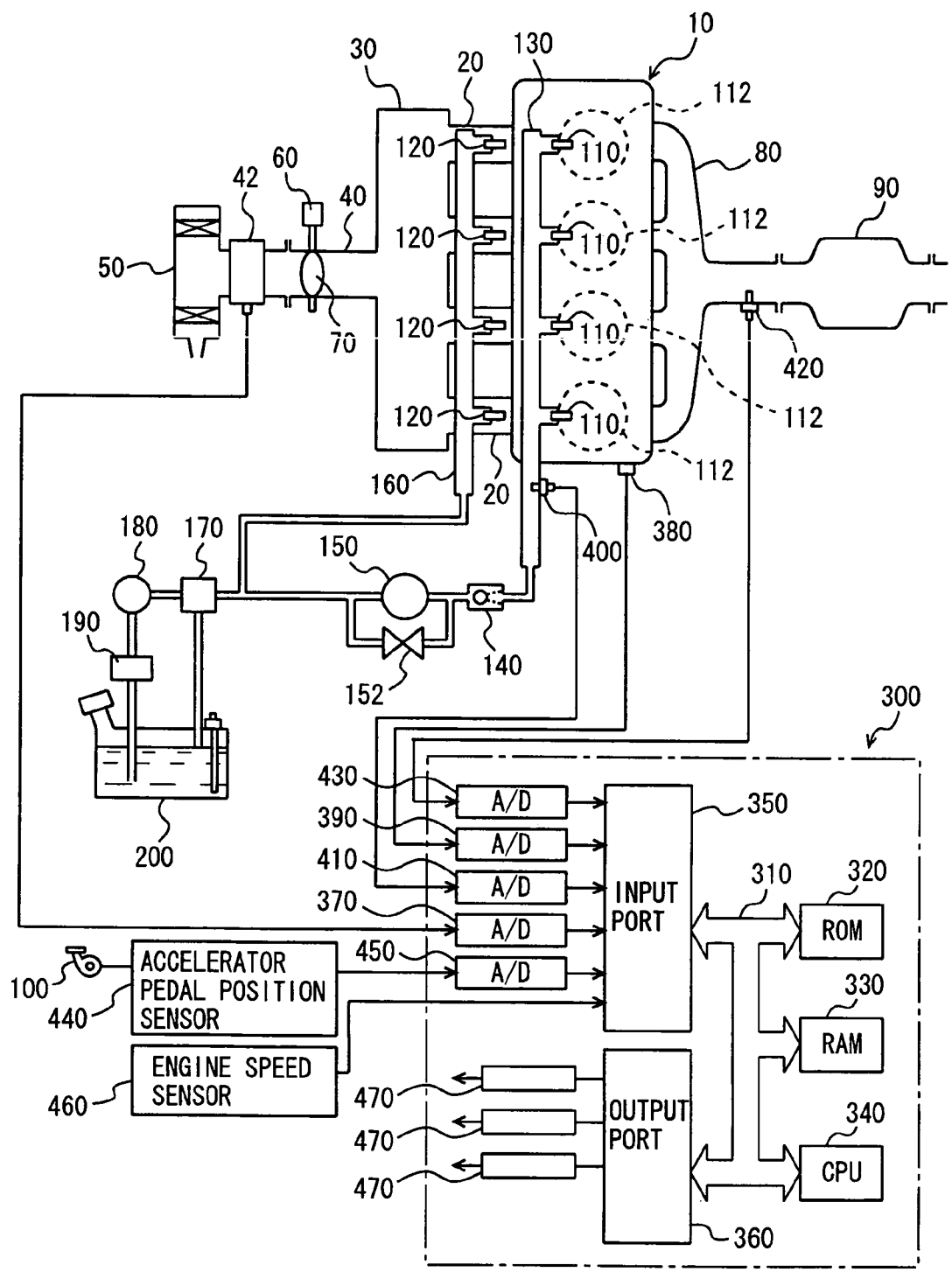

F I G. 2
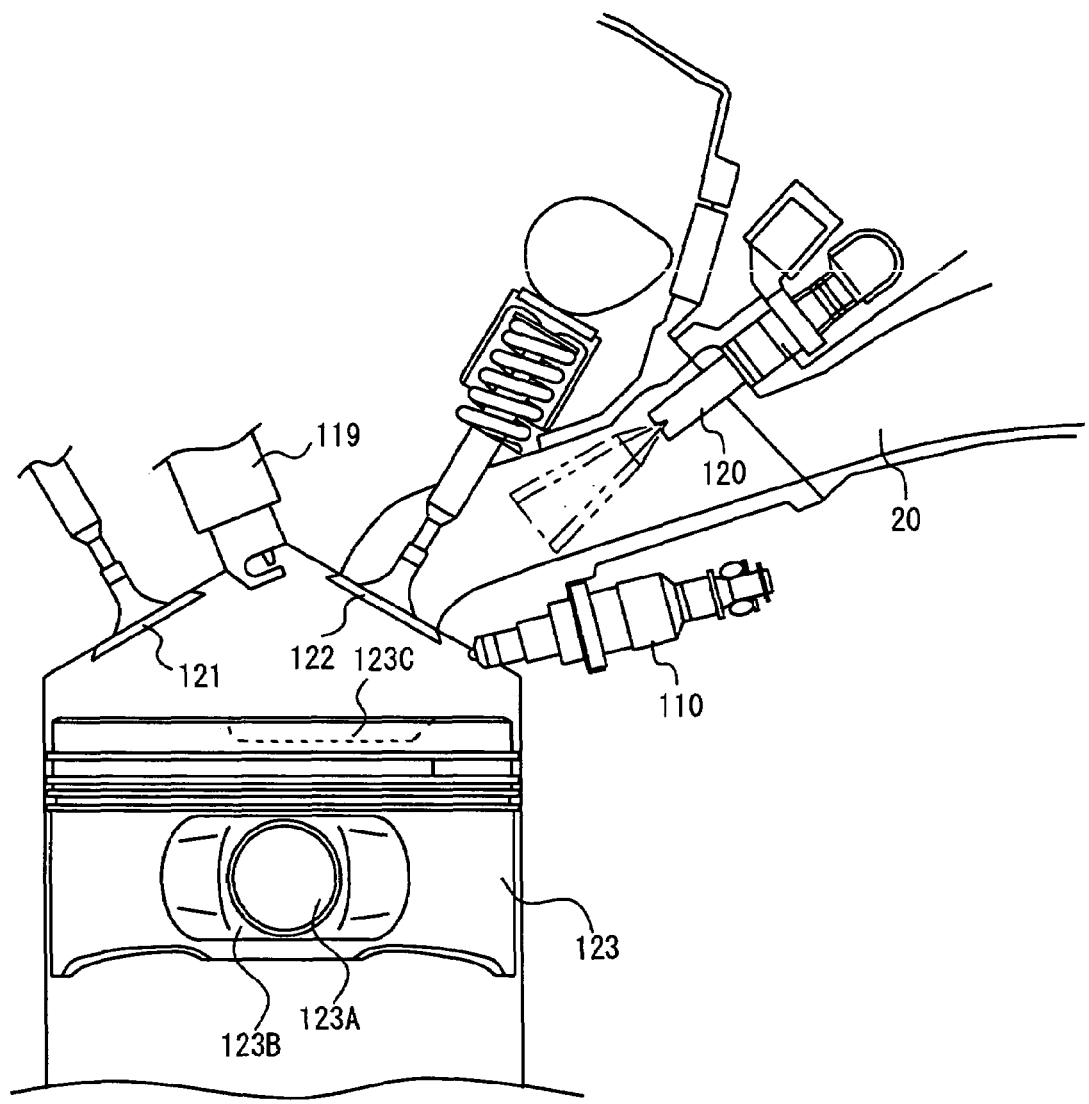

PISTON FOR INTERNAL COMBUSTION ENGINE

This nonprovisional application is based on Japanese Patent Application No. 2005-078295 filed with the Japan Patent Office on Mar. 18, 2005, the entire contents of which are hereby incorporated by reference.

BACKGROUND OF THE INVENTION

1. Field of the Invention

The present invention relates to an internal combustion engine of a vehicle, and particularly, to an internal combustion engine with a cavity at a top end of the piston.

2. Description of the Background Art

An internal combustion engine having an intake manifold injector for injecting fuel into an intake manifold of the engine and an in-cylinder injector for injecting the fuel into a combustion chamber of the engine, and configured to stop fuel injection from the intake manifold injector when the engine load is lower than a preset load and to carry out fuel injection from the intake manifold injector when the engine load is higher than the set load, is known.

As a technique related to such an in-cylinder injector of an engine, Japanese Patent Laying-Open No. 2002-115549 discloses a cylinder direct injection spark ignition engine that can prevent a gas flow from being obstructed by a squish flow generated when a piston approaches the top dead center of combustion, and ensure stable combustion at the time of stratified charge and homogeneous combustion. In the cylinder direct injection spark ignition engine, fuel directly injected into a cylinder from a fuel injector is gathered near a spark plug utilizing a gas flow inside the cylinder to cause ignition, whereby combustion is carried out at a lean air-fuel ratio as a whole. The cylinder direct injection spark ignition engine is characterized in its configuration that a clearance between an exhaust side slope of a piston crown surface and a cylinder head is set to be greater than a clearance between an intake side slope of the piston crown surface and the cylinder head, in a range where the fuel injected into a cavity does not flow out of the cavity into the exhaust side.

According to the cylinder direct injection spark ignition engine, as the clearance of the exhaust side is greater than the clearance of the intake side, the squish flow from the exhaust side toward the intake side can be prevented, which would otherwise occur when the piston approaches the top dead center of combustion. The squish flow from the exhaust side toward the intake side may cause deterioration of combustion stability in the stratified charge and homogeneous combustion as it obstructs a gas flow that gathers the injected fuel near the spark plug in the stratified charge combustion, and also obstructs a gas flow that is supplied for forming a homogeneous air-fuel mixture in the homogeneous combustion. As occurrence of the squish flow from the exhaust side toward the intake side is suppressed, deterioration of combustion stability in the stratified charge and homogeneous combustion due to the squish flow can be prevented. Additionally, deterioration of the combustion stability due to the injected fuel being flown out of the cavity and into the exhaust side, when the exhaust side clearance is increased, can also be prevented.

However, the above-described Japanese Patent Laying-Open No. 2002-115549 merely discloses a cylinder direct injection spark ignition engine in which a cavity is provided at the top end of a piston and the thickness of the top end of the piston is uniform. For example, it is silent about the thickness at the back end of the piston around a piston-pin-boss.

SUMMARY OF THE INVENTION

An object of the present invention is to provide a piston for an internal combustion engine that is excellent in strength, weight balance and cooling characteristics, and an internal combustion engine having the piston.

The piston according to the present invention is used for an internal combustion engine including a fuel injection mechanism injecting fuel into a cylinder. The fuel injection mechanism injects the fuel from a side of a cylinder head into a cylinder bore. The piston includes a cavity provided at a top end of the piston and to which a spray of the fuel injected from the fuel injection mechanism strikes, a piston pin boss provided at a back end of the piston and having a hole through which a piston pin for coupling the piston to a connecting rod is inserted, and a thickness-reduction portion provided at the back end of the piston and around the piston pin boss, a thickness-reduction amount of the thickness-reduction portion being set in correspondence with a position of the cavity.

According to the present invention, the cavity (recess) is formed at the top end of the piston, and a great thickness-reduction portion is provided at the back end of the piston at a position not under the cavity. Specifically, while enormous gas force (combustion force) is applied to the top end of the piston, stress is particularly concentrated at the cavity. Accordingly, thickness is mainly reduced at the back end of the piston at a position not under the cavity. Thus, the piston that can sufficiently withstand the stress can be implemented, and possible damage of the piston due to stress concentration can be prevented. Additionally, when the thickness is reduced at the back end of the piston that corresponds to the periphery of the piston, thickness can be reduced behind the piston ring grooves (on the side toward the piston central axis), and thus the piston rings producing heat by sliding friction can efficiently be cooled using oil. As a result, the piston for an internal combustion engine that is excellent in strength and cooling characteristics can be provided.

Preferably, the thickness-reduction portion is small in the thickness-reduction amount at a portion corresponding to the position of the cavity, and the thickness-reduction portion is great in the thickness-reduction amount at other portions.

According to the present invention, setting the thickness-reduction amount to be small at a portion under the cavity to increase the thickness, and setting the thickness-reduction amount to be great at a portion not under the cavity to reduce the thickness (for the recess of the cavity) (the strength is ensured as there is no cavity), the center of gravity is shifted toward the center and the balance of the piston is achieved. As a result, the piston for an internal combustion engine that is excellent in strength, cooling characteristics and weight balance can be provided.

Preferably, the thickness-reduction portion has a curved surface that is smoothly formed.

According to the present invention, as the thickness-reduction portion is formed by a smooth curve, the stress concentration can be prevented. Accordingly, the piston for an internal combustion engine with excellent strength can be provided.

Further preferably, the thickness-reduction portion has the thickness-reduction amount set so that weight is equally balanced between a thrust direction and an opposite-thrust direction.

According to the present invention, as the thickness is reduced so that weight is equally balanced between the thrust direction and the opposite-thrust direction, the piston for an internal combustion engine with excellent weight balance can be provided.

Further preferably, the position of the cavity is displaced from center of the piston.

According to the present invention, the fuel is injected from the side of the cylinder head (the side of the combustion chamber) into the cylinder bore (that is, the fuel is directly injected into the cylinder), and the injected fuel is directed near the spark plug by means of the cavity. The thickness-reduction portion provided to the piston having such a cavity implements the piston that is excellent in strength, weight balance and cooling characteristics.

The internal combustion engine according to another aspect of the present invention has the piston according to any invention described above.

According to the present invention, the internal combustion engine having the piston excellent in strength, cooling characteristics and weight balance can be provided.

Further preferably, the internal engine further includes a fuel injection mechanism injecting fuel into an intake manifold.

According to the present invention, in addition to the in-cylinder injector, the fuel is injected from the intake manifold injector into the intake manifold to improve the capacity of the internal combustion engine.

Further preferably, the fuel injection mechanism injecting the fuel into the cylinder is an in-cylinder injector, and the fuel injection mechanism injecting the fuel into the intake manifold is an intake manifold injector.

According to the present invention, the internal combustion engine can be provided, to which the in-cylinder injector that is a fuel injection mechanism injecting the fuel into the cylinder and the intake manifold injecting the fuel into the intake manifold are separately provided so that they bear respective shares of injecting the fuel. The internal combustion engine has the piston excellent in strength, weight balance and cooling characteristics.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a schematic configuration diagram of an engine system according to an embodiment of the present invention.

FIG. 2 is a partially enlarged view of FIG. 1.

DESCRIPTION OF THE PREFERRED EMBODIMENTS

Figure 3:
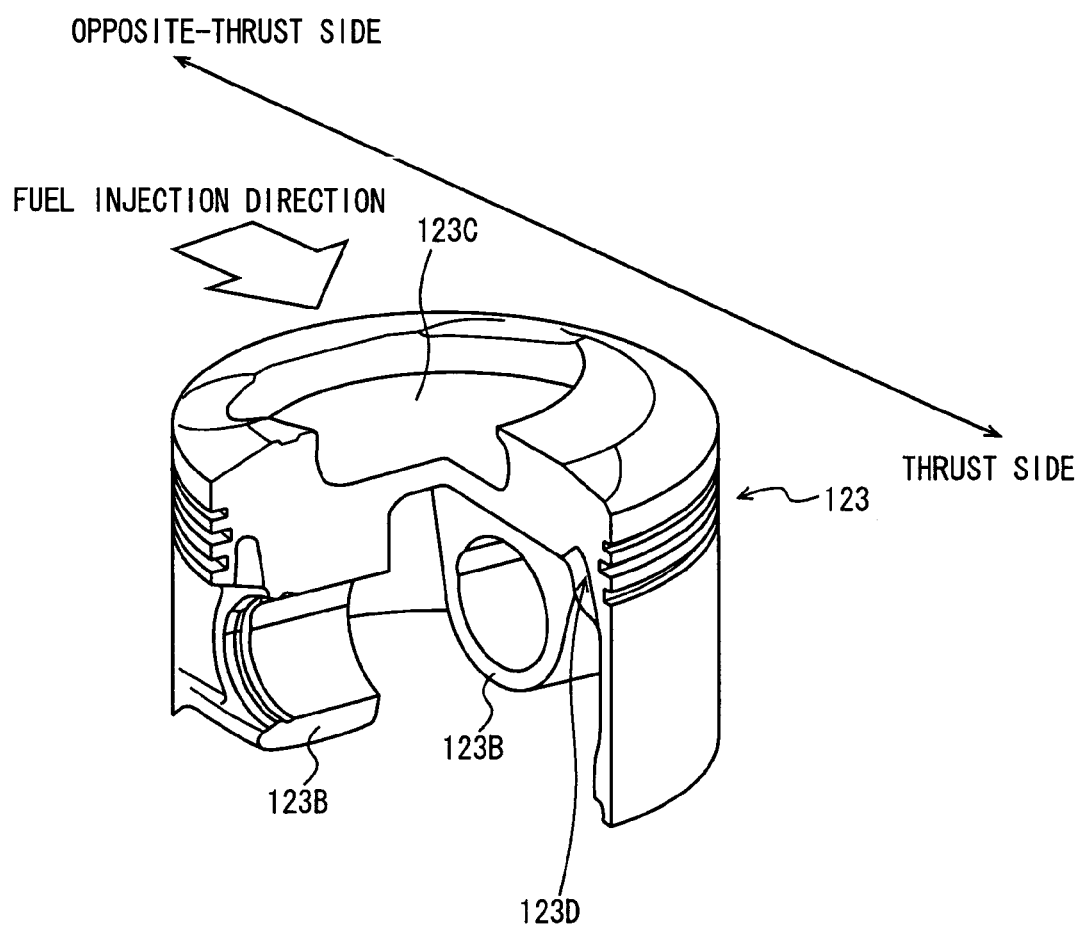
FIG. 3 is a partially developed perspective view of a piston.

Hereinafter reference will be made to the drawings to describe the present invention in an embodiment. In the following description identical components are identically denoted. They are also identical in name and function. Therefore, detailed description thereof will not be repeated.

FIG. 1 is a schematic configuration diagram of an engine system that is controlled by an engine ECU (Electronic Control Unit) implementing the control apparatus for an internal combustion engine according to an embodiment of the present invention. In FIG. 1, an in-line 4-cylinder gasoline engine is shown, although the application of the present invention is not restricted to such an engine, and it may be a V-type 6-cylinder engine, a V-type 8-cylinder engine, an in-line 6-cylinder gasoline engine and the like. Further, in the following description is given on an engine having an in-cylinder injector and an intake manifold injector, although the present invention is applicable to an engine having at least the in-cylinder injector.

As shown in FIG. 1, an engine 10 includes four cylinders 112, each connected via a corresponding intake manifold 20 to a common surge tank 30. Surge tank 30 is connected via an intake duct 40 to an air cleaner 50. An airflow meter 42 is arranged in intake duct 40, and a throttle valve 70 driven by an electric motor 60 is also arranged in intake duct 40. Throttle valve 70 has its degree of opening controlled based on an output signal of an engine ECU (Electronic Control Unit) 300, independently from an accelerator pedal 100. Each cylinder 112 is connected to a common exhaust manifold 80, which is connected to a three-way catalytic converter 90.

Each cylinder 112 is provided with an in-cylinder injector 110 for injecting fuel into the cylinder and an intake manifold injector 120 for injecting fuel into an intake port or/and an intake manifold. Injectors 110 and 120 are controlled based on output signals from engine ECU 300. Further, in-cylinder injector 110 of each cylinder is connected to a common fuel delivery pipe 130. Fuel delivery pipe 130 is connected to a high-pressure fuel pump 150 of an engine-driven type, via a check valve 140 that allows a flow in the direction toward fuel delivery pipe 130. In the present embodiment, an internal combustion engine having two injectors separately provided is explained, although the present invention is not restricted to such an internal combustion engine. For example, the internal combustion engine may have one injector that can effect both in-cylinder injection and intake manifold injection.

As shown in FIG. 1, the discharge side of high-pressure fuel pump 150 is connected via an electromagnetic spill valve 152 to the intake side of high-pressure fuel pump 150. As the degree of opening of electromagnetic spill valve 152 is smaller, the quantity of the fuel supplied from high-pressure fuel pump 150 into fuel delivery pipe 130 increases. When electromagnetic spill valve 152 is fully open, the fuel supply from high-pressure fuel pump 150 to fuel delivery pipe 130 is stopped. Electromagnetic spill valve 152 is controlled based on an output signal of engine ECU 300.

Each intake manifold injector 120 is connected to a common fuel delivery pipe 160 on a low pressure side. Fuel delivery pipe 160 and high-pressure fuel pump 150 are connected via a common fuel pressure regulator 170 to a low-pressure fuel pump 180 of an electric motor-driven type. Further, low-pressure fuel pump 180 is connected via a fuel filter 190 to a fuel tank 200. Fuel pressure regulator 170 is configured to return a part of the fuel discharged from low-pressure fuel pump 180 back to fuel tank 200 when the pressure of the fuel discharged from low-pressure fuel pump 180 is higher than a preset fuel pressure. This prevents both the pressure of the fuel supplied to intake manifold injector 120 and the pressure of the fuel supplied to high-pressure fuel pump 150 from becoming higher than the above-described preset fuel pressure.

Engine ECU 300 is implemented with a digital computer, and includes a ROM (Read Only Memory) 320, a RAM (Random Access Memory) 330, a CPU (Central Processing Unit) 340, an input port 350, and an output port 360, which are connected to each other via a bidirectional bus 310.

Airflow meter 42 generates an output voltage that is proportional to an intake air quantity, and the output voltage is input via an A/D converter 370 to input port 350. A coolant temperature sensor 380 is attached to engine 10, and generates an output voltage proportional to a coolant temperature of the engine, which is input via an A/D converter 390 to input port 350.

A fuel pressure sensor 400 is attached to fuel delivery pipe 130, and generates an output voltage proportional to a fuel pressure within fuel delivery pipe 130, which is input via an A/D converter 410 to input port 350. An air-fuel ratio sensor 420 is attached to an exhaust manifold 80 located upstream of three-way catalytic converter 90. Air-fuel ratio sensor 420 generates an output voltage proportional to an oxygen concentration within the exhaust gas, which is input via an A/D converter 430 to input port 350.

Air-fuel ratio sensor 420 of the engine system of the present embodiment is a full-range air-fuel ratio sensor (linear air-fuel ratio sensor) that generates an output voltage proportional to the air-fuel ratio of the air-fuel mixture burned in engine 10. As air-fuel ratio sensor 420, an $O_2$ sensor may be employed, which detects, in an on/off manner, whether the air-fuel ratio of the air-fuel mixture burned in engine 10 is rich or lean with respect to a stoichiometric air-fuel ratio.

Accelerator pedal 100 is connected with an accelerator pedal position sensor 440 that generates an output voltage proportional to the degree of press down of accelerator pedal 100, which is input via an A/D converter 450 to input port 350. Further, an engine speed sensor 460 generating an output pulse representing the engine speed is connected to input port 350. ROM 320 of engine ECU 300 prestores, in the form of a map, values of fuel injection quantity that are set in association with operation states based on the engine load factor and the engine speed obtained by the above-described accelerator pedal position sensor 440 and engine speed sensor 460, and correction values thereof set based on the engine coolant temperature.

FIG. 2 is a partially enlarged view of FIG. 1. FIG. 2 shows the positional relationship of in-cylinder injector 110 and intake manifold injector 120 in each cylinder 112 shown in FIG. 1, and the positional relationship of intake manifold 20, an intake valve 122, an exhaust valve 121, a spark plug 119, and a piston 123.

Intake valve 122 is provided on a combustion chamber side of intake manifold 20, and intake manifold injector 120 is arranged upstream of intake valve 122. Intake manifold injector 120 injects fuel toward an inner wall of intake manifold 20 that is an intake pipe.

As one example, the fuel injection direction of intake manifold injector 120 may be set as follows.

Due to the overlap of intake valve 122 and exhaust valve 121, PMs (Particulate Matters) inside the combustion chamber may reversely flow into intake manifold 20, and the fuel injected from intake manifold injector 120 to be a fine spray serves as an adhesive, which then accumulates as a deposit on the inner wall of intake manifold on a side closer to intake valve 122. Intake manifold injector 120 is arranged so that its fuel injection direction is oriented toward the deposit. Thus, by the fuel injected from intake manifold injector 120, the deposit can be washed away.

Further, intake manifold 20 is not provided with anything that forms swirl inside the combustion chamber, such as a swirl control valve. If the swirl control valve is provided, then the flow coefficient is decreased and adequate air cannot be introduced into the combustion chamber at WOT (Wide Open Throttle). In contrast, in the internal combustion engine of the present embodiment, a high-flow-rate port is realized with an increased flow coefficient. It is noted that an intake port of tangential type may be employed, if a high flow rate can be realized. The intake port of tangential type is not formed in a spiral fashion around intake valve 122 to spread horizontally, but it has a tip that extends straight to form a large arc vertically. Therefore, the resistance relative to a flow inside the intake port is small, and the flow coefficient of the intake port is far greater than that of the swirl port. Thus, the volumetric efficiency of engine 10 increases and a large amount of air can be suctioned into the combustion chamber. The flow coefficient Cf of the intake port here is preferably at least 0.5-0.7.

As shown in FIG. 2, a cavity 123C, which is a recess formed by a moderate curve, is provided at the top end of piston 123 at a position opposing to in-cylinder injector 110. The fuel is injected from in-cylinder injector 110 toward cavity 123C. Here, as the top end of piston 123 does not have any sharp edge, a spray of fuel injected from in-cylinder injector 110 is not split by such a sharp edge. While such split may invite a state of local rich (as used herein, local rich means that a rich air-fuel mixture is formed at a location other than around spark plug 119) that may disadvantageously affect combustion, this state can thus be prevented. It is noted that the fuel injection ratio between in-cylinder injector 110 and intake manifold injector 120 arranged as shown in FIG. 2 will be detailed later.

As shown in FIG. 2, as to piston 123, piston 123 and a connecting rod (not shown) are coupled with a piston pin 123A. Piston 123 is provided with piston pin boss portions 123B for storing piston pin 123A. An enormous gas force and an inertial force of piston 123 are directly applied to the top end of piston 123.

Referring to FIG. 3, the structure of piston 123 will be described. As shown in FIG. 3, piston 123 has two piston pin boss portions 123B arranged so that a connecting rod is interposed therebetween. A small end portion of the connecting rod is interposed between these two piston pin boss portions 123B. Further, two piston pin boss portions 123B and the small end portion of the connecting rod are rotatably coupled by piston pin 123A.

As shown in FIG. 3, in the cross section through the central line of cavity 123C, a thickness-reduction portion 123D is provided on a thrust side (a side without cavity 123C), which is greater than a thickness-reduction portion in an opposite-thrust side. As the stress received by the thrust side without cavity 123C is smaller than that received by the opposite-thrust side with cavity 123C, the thickness of piston 123 can largely be reduced as implemented by thickness-reduction portion 123D. However, piston 123 has such thickness that it can fully withstand the stress being applied. In the following, the thickness-reduction portion will be detailed further.

Figure 4:
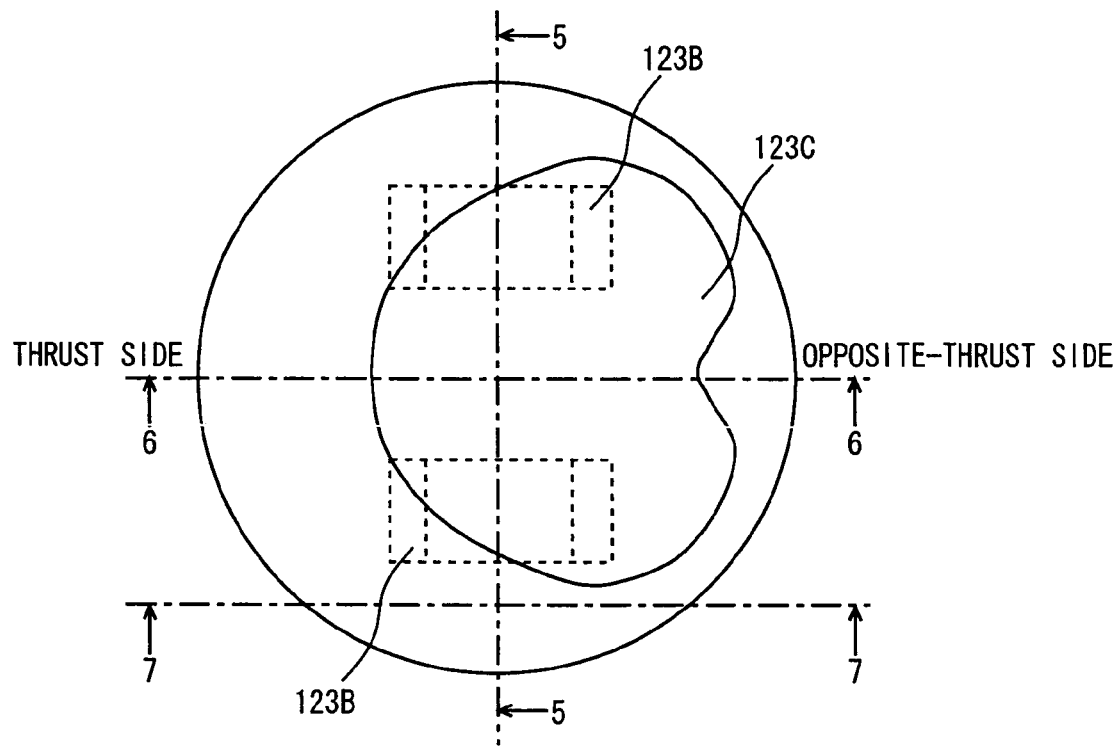
FIG. 4 is a top view of the piston.

FIG. 4 shows the top end of piston 123 as seen from above. It is noted that the shape of cavity 123C shown in FIG. 4 is an example, and the present invention is not limited to cavity 123C of this shape. In conformity with FIG. 3, indication of the thrust side and the opposite thrust side is provided in FIG. 4.

Figure 5:
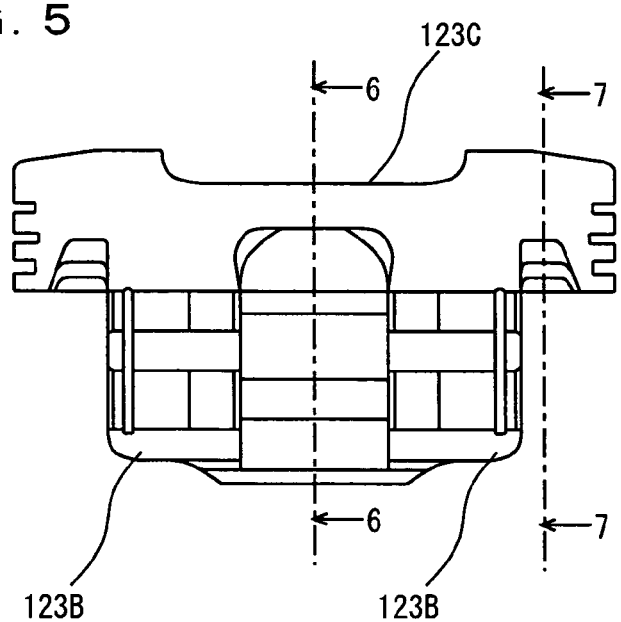
FIGS. 5-7 are cross-sectional views of the piston.
Figure 6:
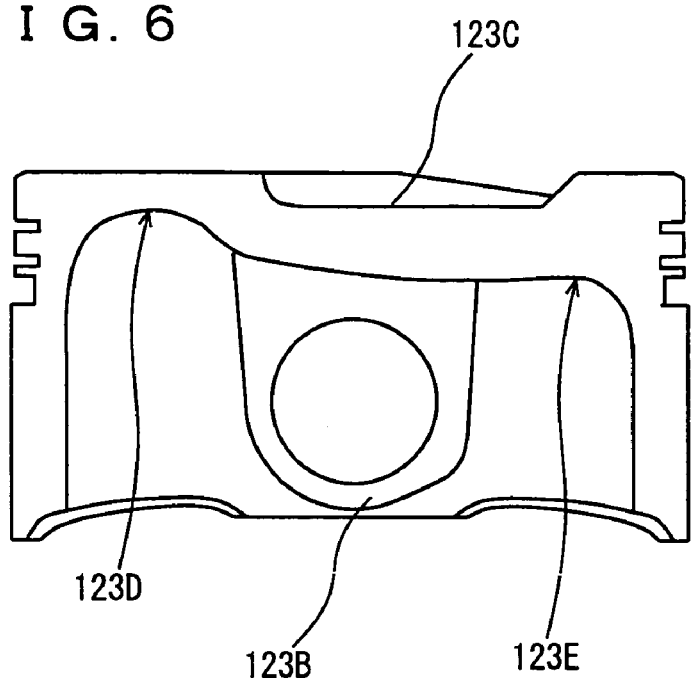
Figure 7:
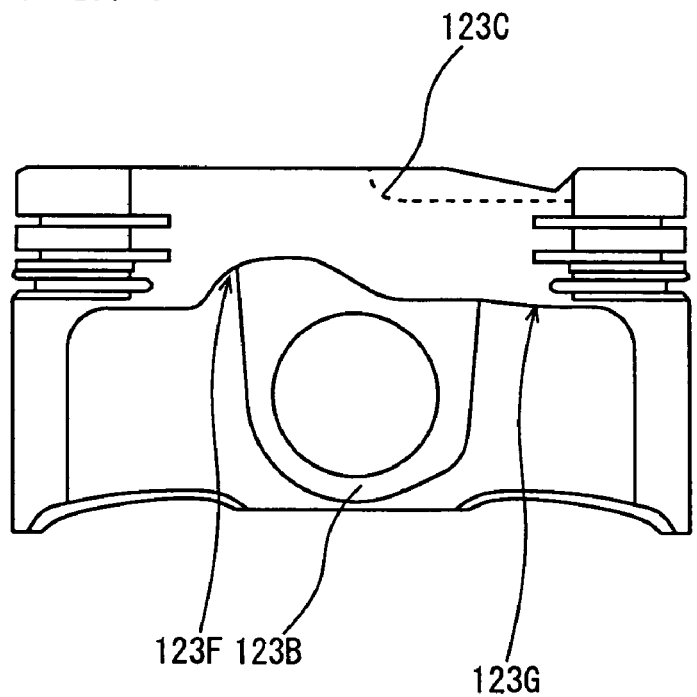

FIG. 5 shows a cross section along 5-5 in FIG. 4, FIG. 6 shows a cross section along 6-6 in FIGS. 4 and 5, and FIG. 7 shows a cross section along 7-7 in FIGS. 4 and 5.

As shown in FIG. 6, in the cross section along 6-6, thickness-reduction portions 123D and 123E are provided on a side opposite to the top end of piston 123 (hereinafter referred to as the back end of piston 123). Thickness-reduction portion 123D provided on a side without cavity 123C achieves greater thickness reduction than thickness-reduction portion 123E provided on a side with cavity 123C does. Thickness-reduction portion 123D is designed so that the thickness reduced by thickness-reduction portion 123D can withstand the stress placed on the top end of piston 123. Thickness-reduction portion 123E is designed so that the thickness reduced by thickness-reduction portion 123E can withstand the stress placed on the top end of piston 123, even when the stress is increased due to cavity 123C (such as stress concentration). Here, as thickness-reduction portions 123D and 123E are different in shape, piston 123 is not fully balanced in the thrust/opposite-thrust direction. This is solved by providing another thickness-reduction portion as balance measures, which will be described later.

Thickness-reduction portion 123D achieves such a great reduction in thickness that a space is formed up to the grooves of the piston rings. Thus, the piston rings, which abut against the cylinder to slide and thereby produce great heat, can efficiently be cooled using oil.

As shown in FIG. 7, also in the cross section along 7-7 similarly as in the cross section along 6-6, thickness-reduction portions 123F and 123G are provided at the back end of piston 123. Thickness-reduction portion 123F provided on a side without cavity 123C can be formed so as to achieve greater thickness reduction than thickness-reduction portion 123G provided on a side with cavity 123C does. In this case also, similarly to the foregoing description, thickness-reduction portion 123F is designed so that the thickness reduced by thickness-reduction portion 123F can withstand the stress placed on the top end of piston 123. Thickness-reduction portion 123G is designed so that the thickness reduced by thickness-reduction portion 123G can withstand the stress placed on the top end of piston 123, even when the stress is increased due to cavity 123C (such as stress concentration).

Thus, in this cross section along 7-7 also, thickness-reduction portion 123F provided on the side without cavity 123C can be formed greatly. This is utilized in solving the aforementioned balance issue. Specifically, in both of the cross section along 6-6 shown in FIG. 6 and cross section along 7-7 shown in FIG. 7, thickness is allowed to be reduced greatly on the side without cavity 123C (thrust side) whereas it is not allowed to be reduced greatly on the side with cavity 123C (opposite-thrust side), and therefore piston 123 cannot fully balanced in the thrust/opposite-thrust direction. In order to solve this problem, in the cross section shown in FIG. 7, thickness-reduction portion 123F is shaped so that piston 123 can be balanced in the thrust/opposite-thrust direction and can withstand the stress placed on the top end of piston 123.

Specifically, first, the shape of thickness-reduction portion 123D is designed to determine the necessary thickness of the top end of piston 123 on the side without cavity 123C (thrust side) for attaining withstanding capacity against the stress placed on piston 123. Next, not giving priority on the balance in the thrust/opposite-thrust direction in the cross section along 6-6, but giving priority to the withstanding capacity against the stress placed on piston 123 on the side with cavity 123C (opposite-thrust side), the shape of thickness-reduction portion 123E is designed. Here, since the weight is lighter on the opposite-thrust side due to cavity 123C, if priority is given to the balance, then the resulting thickness becomes greater than a thickness that is determined by the withstanding capacity against the stress placed on piston 123 and hence, thickness-reduction portion 123E cannot be designed to achieve great thickness-reduction.

Next, giving priority to the withstanding capacity against the stress placed on piston 123 on the side with cavity 123C (opposite-thrust side) shown in FIG. 7, the shape of thickness-reduction portion 123G is designed. Next, the shape of thickness-reduction portion 123F is determined so that piston 123 as a whole is balanced in the thrust/opposite thrust direction.

Here, thickness-reduction portion 123F positioned opposite to thickness-reduction portion 123E is formed to be great, according to the fact that thickness-reduction portion 123E has been formed to achieve great thickness reduction in light of the capacity of piston 123 withstanding the stress being placed thereon, which reduction could not have been achieved if priority is given to balance. Specifically, in order to balance thickness-reduction portion 123E on the side with cavity 123C (opposite-thrust side) being greatly formed and the weight on the opposite-thrust side being light due to cavity 123C, thickness-reduction portion 123F on the thrust side is greatly formed to reduce the weight on the thrust side. Thus, piston 123 as a whole can be balanced in the thrust/ opposite thrust direction.

It is noted that thickness-reduction portions 123D, 123E, 123F, and 123G are formed with smooth curves. Thus, there are no sharp edges and hence no stress concentration associated with such sharp edges may be invited.

As above, according to engine 10 of the present embodiment, the thickness-reduction portions are mainly provided at the back end of piston 123 at positions not under cavity 123C provided at top end of piston 123. Enormous gas force (combustion force) is applied to the top end of piston 123, and in particular, stress is concentrated at cavity 123C. Accordingly, it is designed such that the thickness-reduction amount at the back end of piston 123 is great at positions not under cavity 123C. Thus, the piston that can sufficiently withstand the stress can be implemented, and possible damage of piston 123 due to stress concentration associated with cavity 123C can be prevented. Additionally, as the thickness is reduced at the back end of piston 123 that corresponds to the periphery of piston 123, thickness can be reduced behind the piston ring grooves (on the side toward piston central axis), thus cooling of the piston rings, which produce heat by sliding friction, by means of oil can be facilitated. Further, setting the thickess-reduction amount to be small at a portion under cavity 123C to increase the thickness, and setting the thickness-reduction amount to be great at portions not under cavity 123C to reduce the thickness (for the recess of cavity 123C), balance of the piston is achieved. As a result, the weight of the piston can be reduced.

Engine (1) to which Present Control Apparatus is Suitably Applied

An engine (1) to which the control apparatus of the present embodiment is suitably applied will now be described.

Figure 8:
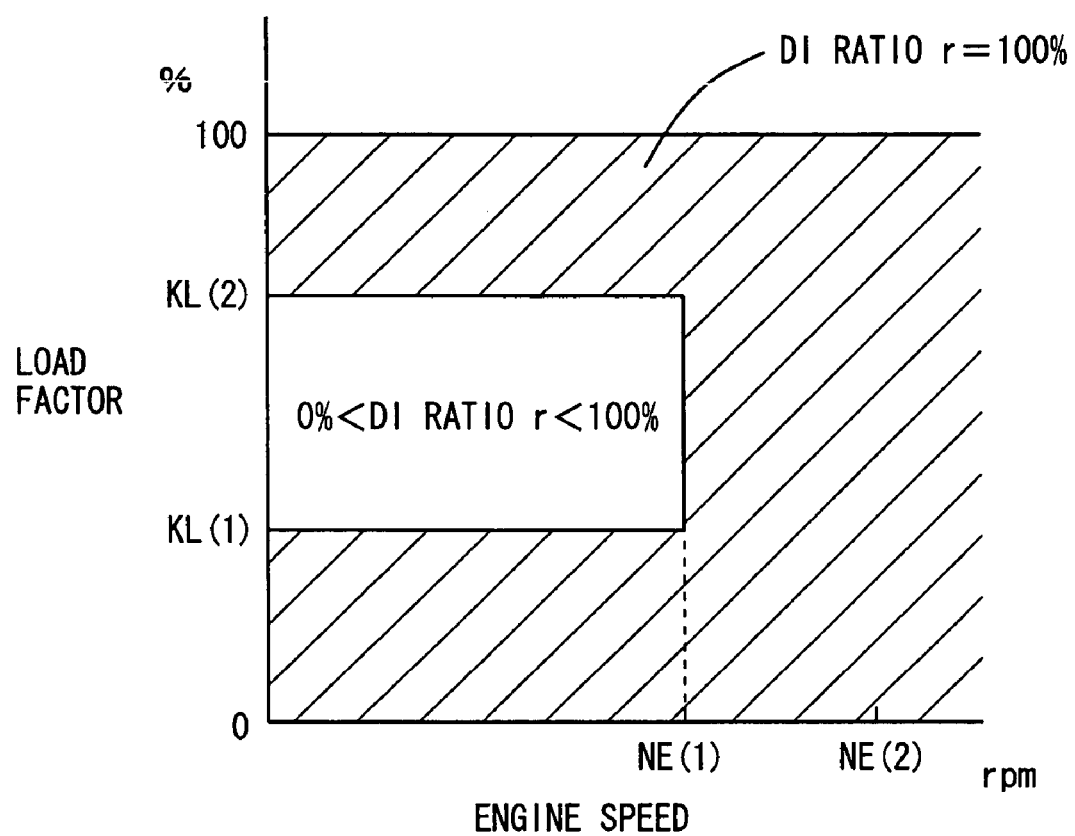
FIG. 8 shows a DI ratio map for a warm state of an engine (1) to which a control apparatus according to an embodiment of the present invention is suitably applied.
Figure 9:
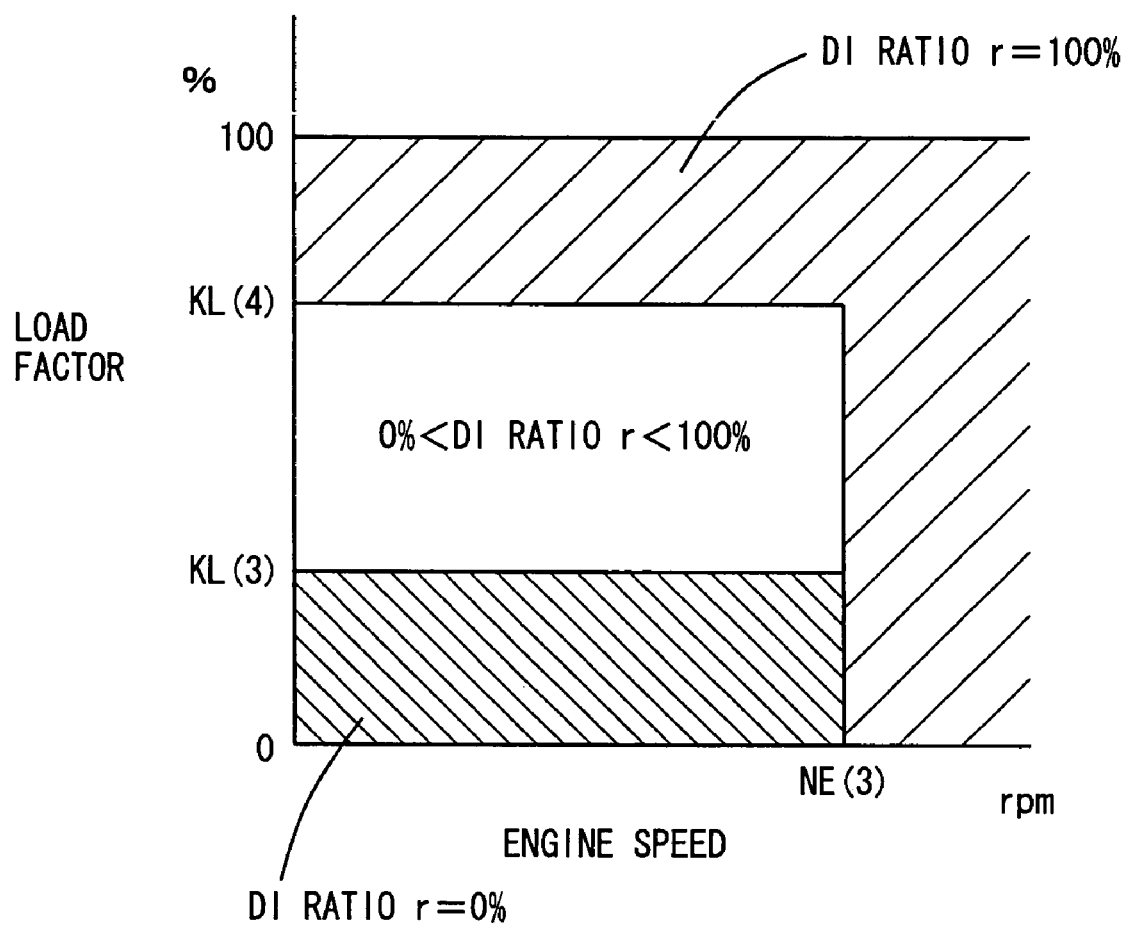
FIG. 9 shows a DI ratio map for a cold state of an engine (1) to which a control apparatus according to an embodiment of the present invention is suitably applied.

Referring to FIGS. 8 and 9, maps each indicating a fuel injection ratio between in-cylinder injector 110 and intake manifold injector 120, identified as information associated with an operation state of engine 10, will now be described. Herein, the fuel injection ratio between the two injectors is also expressed as a ratio of the quantity of the fuel injected from in-cylinder injector 110 to the total quantity of the fuel injected, which is referred to as the "fuel injection ratio of in-cylinder injector 110", or a "DI (Direct Injection) ratio (r)". The maps are stored in ROM 320 of engine ECU 300. FIG. 8 is the map for a warm state of engine 10, and FIG. 9 is the map for a cold state of engine 10.

In the maps illustrated in FIGS. 8 and 9, with the horizontal axis representing an engine speed of engine 10 and the vertical axis representing a load factor, the fuel injection ratio of in-cylinder injector 110, or the DI ratio r, is expressed in percentage.

As shown in FIGS. 8 and 9, the DI ratio r is set for each operation range that is determined by the engine speed and the load factor of engine 10. "DI RATIO r=100%" represents the range where fuel injection is carried out using only in-cylinder injector 110, and "DI RATIO r=0%" represents the range where fuel injection is carried out using only intake manifold injector 120. "DI RATIO r≠0%", "DI RATIO r≠100%" and "0%<DI RATIO r<100%" each represent the range where fuel injection is carried out using both in-cylinder injector 110 and intake manifold injector 120. Generally, in-cylinder injector 110 contributes to an increase of output performance, while intake manifold injector 120 contributes to uniformity of the air-fuel mixture. These two kinds of injectors having different characteristics are appropriately selected depending on the engine speed and the load factor of engine 10, so that only homogeneous combustion is conducted in the normal operation state of the engine (other than the abnormal operation state such as a catalyst warm-up state during idling).

Further, as shown in FIGS. 8 and 9, the fuel injection ratio between in-cylinder injector 110 and intake manifold injector 120, or, the DI ratio r, is defined individually in the map for the warm state and in the map for the cold state of the engine. The maps are configured to indicate different control ranges of in-cylinder injector 110 and intake manifold injector 120 as the temperature of engine 10 changes. When the temperature of engine 10 detected is equal to or higher than a predetermined temperature threshold value, the map for the warm state shown in FIG. 8 is selected; otherwise, the map for the cold state shown in FIG. 9 is selected. One or both of in-cylinder injector 110 and intake manifold injector 120 are controlled based on the selected map and according to the engine speed and the load factor of engine 10.

The engine speed and the load factor of engine 10 set in FIGS. 8 and 9 will now be described. In FIG. 8, NE(1) is set to 2500 rpm to 2700 rpm, KL(1) is set to 30% to 50%, and KL(2) is set to 60% to 90%. In FIG. 9, NE(3) is set to 2900 rpm to 3100 rpm. That is, NE(1)<NE(3). NE(2) in FIG. 8 as well as KL(3) and KL(4) in FIG. 9 are also set as appropriate.

When comparing FIG. 8 and FIG. 9, NE(3) of the map for the cold state shown in FIG. 9 is greater than NE(1) of the map for the warm state shown in FIG. 8. This shows that, as the temperature of engine 10 is lower, the control range of intake manifold injector 120 is expanded to include the range of higher engine speed. That is, in the case where engine 10 is cold, deposits are unlikely to accumulate in the injection hole of in-cylinder injector 110 (even if the fuel is not injected from in-cylinder injector 110). Thus, the range where the fuel injection is to be carried out using intake manifold injector 120 can be expanded, to thereby improve homogeneity.

When comparing FIG. 8 and FIG. 9, "DI RATIO r=100%" in the range where the engine speed of engine 10 is NE(1) or higher in the map for the warm state, and in the range where the engine speed is NE(3) or higher in the map for the cold state. In terms of load factor, "DI RATIO r=100%" in the range where the load factor is KL(2) or greater in the map for the warm state, and in the range where the load factor is KL(4) or greater in the map for the cold state. This means that in-cylinder injector 110 solely is used in the range of a predetermined high engine speed, and in the range of a predetermined high engine load. That is, in the high speed range or the high load range, even if fuel injection is carried out using only in-cylinder injector 110, the engine speed and the load of engine 10 are high, ensuring a sufficient intake air quantity, so that it is readily possible to obtain a homogeneous air-fuel mixture even using only in-cylinder injector 110. In this manner, the fuel injected from in-cylinder injector 110 is atomized within the combustion chamber involving latent heat of vaporization (or, absorbing heat from the combustion chamber). Thus, the temperature of the air-fuel mixture is decreased at the compression end, whereby antiknock performance is improved. Further, since the temperature within the combustion chamber is decreased, intake efficiency improves, leading to high power output.

In the map for the warm state in FIG. 8, fuel injection is also carried out using only in-cylinder injector 110 when the load factor is KL(1) or less. This shows that in-cylinder injector 110 alone is used in a predetermined low load range when the temperature of engine 10 is high. When engine 10 is in the warm state, deposits are likely to accumulate in the injection hole of in-cylinder injector 110. However, when fuel injection is carried out using in-cylinder injector 110, the temperature of the injection hole can be lowered, whereby accumulation of deposits is prevented. Further, clogging of in-cylinder injector 110 may be prevented while ensuring the minimum fuel injection quantity thereof. Thus, in-cylinder injector 110 alone is used in the relevant range.

When comparing FIG. 8 and FIG. 9, there is a range of "DI RATIO r=0%" only in the map for the cold state in FIG. 9. This shows that fuel injection is carried out using only intake manifold injector 120 in a predetermined low load range (KL(3) or less) when the temperature of engine 10 is low. When engine 10 is cold and low in load and the intake air quantity is small, atomization of the fuel is unlikely to occur. In such a range, it is difficult to ensure favorable combustion with the fuel injection from in-cylinder injector 110. Further, particularly in the low-load and low-speed range, high output using in-cylinder injector 110 is unnecessary. Accordingly, fuel injection is carried out using only intake manifold injector 120, rather than in-cylinder injector 110, in the relevant range.

Further, in an operation other than the normal operation, or, in the catalyst warm-up state during idling of engine 10 (abnormal operation state), in-cylinder injector 110 is controlled to carry out stratified charge combustion. By causing the stratified charge combustion during the catalyst warm-up operation, warming up of the catalyst is promoted, and exhaust emission is thus improved.

Engine (2) to which Present Control Apparatus is Suitably Applied

Hereinafter, an engine (2) to which the control apparatus of the present embodiment is suitably applied will be described. In the following description of the engine (2), the configurations similar to those of the engine (1) will not be repeated.

Figure 10:
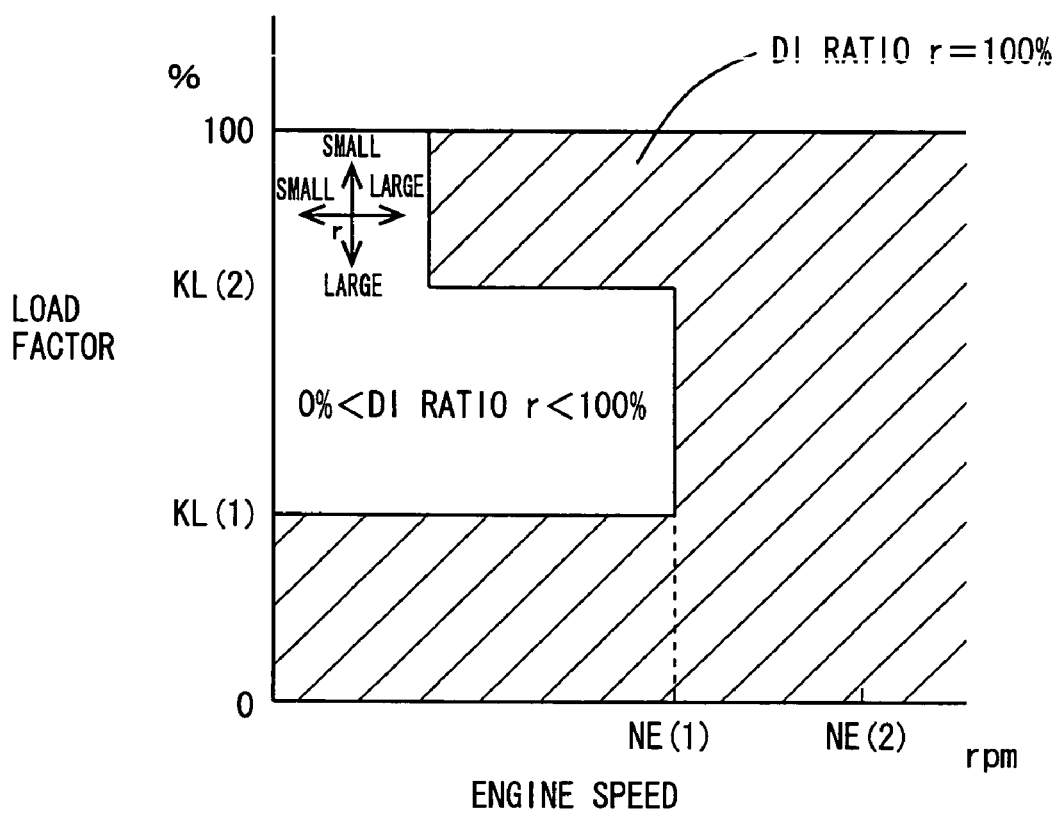
FIG. 10 shows a DI ratio map for a warm state of an engine (2) to which a control apparatus according to an embodiment of the present invention is suitably applied.
Figure 11:
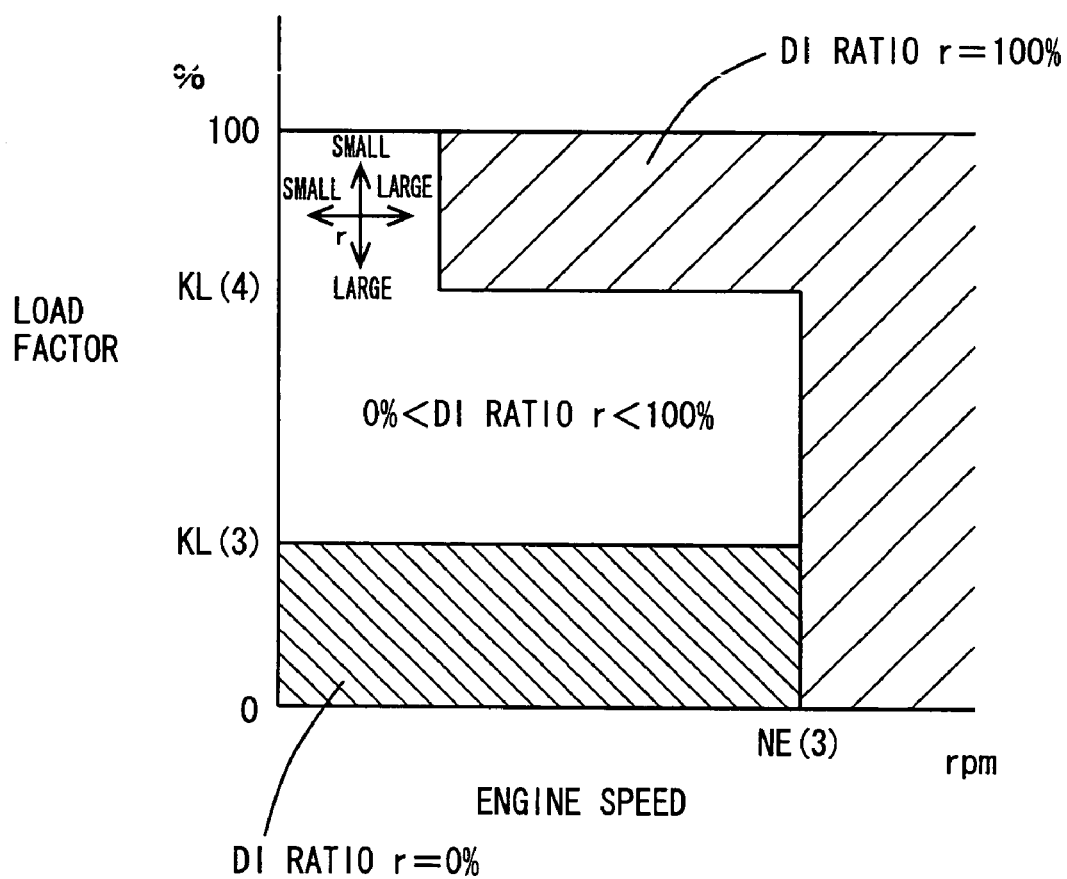
FIG. 11 shows a DI ratio map for a cold state of an engine (2) to which a control apparatus according to an embodiment of the present invention is suitably applied.

Referring to FIGS. 10 and 11, maps each indicating the fuel injection ratio between in-cylinder injector 110 and intake manifold injector 120, identified as information associated with the operation state of engine 10, will be described. The maps are stored in ROM 320 of engine ECU 300. FIG. 10 is the map for the warm state of engine 10, and FIG. 11 is the map for the cold state of engine 10.

FIGS. 10 and 11 differ from FIGS. 8 and 9 in the following points. "DI RATIO r=100%" holds in the range where the engine speed of the engine is equal to or higher than NE(1) in the map for the warm state, and in the range where the engine speed is NE(3) or higher in the map for the cold state. Further, except for the low-speed range, "DI RATIO r=100%" holds in the range where the load factor is KL(2) or greater in the map for the warm state, and in the range where the load factor is KL(4) or greater in the map for the cold state. This means that fuel injection is carried out using only in-cylinder injector 110 in the range where the engine speed is at a predetermined high level, and that fuel injection is often carried out using only in-cylinder injector 110 in the range where the engine load is at a predetermined high level. However, in the low-speed and high-load range, mixing of an air-fuel mixture formed by the fuel injected from in-cylinder injector 110 is poor, and such inhomogeneous air-fuel mixture within the combustion chamber may lead to unstable combustion. Thus, the fuel injection ratio of in-cylinder injector 110 is increased as the engine speed increases where such a problem is unlikely to occur, whereas the fuel injection ratio of in-cylinder injector 110 is decreased as the engine load increases where such a problem is likely to occur. These changes in the fuel injection ratio of in-cylinder injector 110, or, the DI ratio r, are shown by crisscross arrows in FIGS. 10 and 11. In this manner, variation in output torque of the engine attributable to the unstable combustion can be suppressed. It is noted that these measures are approximately equivalent to the measures to decrease the fuel injection ratio of in-cylinder injector 110 as the state of the engine moves toward the predetermined low speed range, or to increase the fuel injection ratio of in-cylinder injector 110 as the engine state moves toward the predetermined low load range. Further, except for the relevant range (indicated by the crisscross arrows in FIGS. 10 and 11), in the range where fuel injection is carried out using only in-cylinder injector 110 (on the high speed side and on the low load side), a homogeneous air-fuel mixture is readily obtained even when the fuel injection is carried out using only in-cylinder injector 110. In this case, the fuel injected from in-cylinder injector 110 is atomized within the combustion chamber involving latent heat of vaporization (by absorbing heat from the combustion chamber). Accordingly, the temperature of the air-fuel mixture is decreased at the compression side, and thus, the antiknock performance improves. Further, with the temperature of the combustion chamber decreased, intake efficiency improves, leading to high power output.

In engine 10 explained in conjunction with FIGS. 8-11, homogeneous combustion is achieved by setting the fuel injection timing of in-cylinder injector 110 in the intake stroke, while stratified charge combustion is realized by setting it in the compression stroke. That is, when the fuel injection timing of in-cylinder injector 110 is set in the compression stroke, a rich air-fuel mixture can be located locally around the spark plug, so that a lean air-fuel mixture in the combustion chamber as a whole is ignited to realize the stratified charge combustion. Even if the fuel injection timing of in-cylinder injector 110 is set in the intake stroke, stratified charge combustion can be realized if it is possible to provide a rich air-fuel mixture locally around the spark plug.

As used herein, the stratified charge combustion includes both the stratified charge combustion and semi-stratified charge combustion. In the semi-stratified charge combustion, intake manifold injector 120 injects fuel in the intake stroke to generate a lean and homogeneous air-fuel mixture in the whole combustion chamber, and then in-cylinder injector 110 injects fuel in the compression stroke to generate a rich air-fuel mixture around the spark plug, so as to improve the combustion state. Such semi-stratified charge combustion is preferable in the catalyst warm-up operation for the following reasons. In the catalyst warm-up operation, it is necessary to considerably retard the ignition timing and maintain a favorable combustion state (idling state) so as to cause a high-temperature combustion gas to reach the catalyst. Further, a certain quantity of fuel needs to be supplied. If the stratified charge combustion is employed to satisfy these requirements, the quantity of the fuel will be insufficient. If the homogeneous combustion is employed, the retarded amount for the purpose of maintaining favorable combustion is small compared to the case of stratified charge combustion. For these reasons, the above-described semi-stratified charge combustion is preferably employed in the catalyst warm-up operation, although either of stratified charge combustion and semi-stratified charge combustion may be employed.

Further, in the engine explained in conjunction with FIGS. 8-11, the fuel injection timing of in-cylinder injector 110 is set in the intake stroke in a basic range corresponding to the almost entire range (here, the basic range refers to the range other than the range where semi-stratified charge combustion is carried out with fuel injection from intake manifold injector 120 in the intake stroke and fuel injection from in-cylinder injector 110 in the compression stroke, which is carried out only in the catalyst warm-up state). The fuel injection timing of in-cylinder injector 110, however, may be set temporarily in the compression stroke for the purpose of stabilizing combustion, for the following reasons.

When the fuel injection timing of in-cylinder injector 110 is set in the compression stroke, the air-fuel mixture is cooled by the injected fuel while the temperature in the cylinder is relatively high. This improves the cooling effect and, hence, the antiknock performance. Further, when the fuel injection timing of in-cylinder injector 110 is set in the compression stroke, the time from the fuel injection to the ignition is short, which ensures strong penetration of the injected fuel, so that the combustion rate increases. The improvement in antiknock performance and the increase in combustion rate can prevent variation in combustion, and thus, combustion stability is improved.

Further, the map for the warm state shown in FIG. 8 or 10 may be used in an off-idle state (when the idle switch is off and the accelerator pedal is pressed) irrespective of the temperature of engine 10 (that is, in both of the warm state and the cold state).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A piston for an internal combustion engine comprising:
a fuel injection mechanism injecting a fuel into a cylinder, wherein said fuel injection mechanism injects the fuel from a side of a cylinder head into a cylinder bore, and wherein said piston includes:
    a cavity provided at a top end of said piston that is formed asymmetrically relative to the center axis of the piston and to which a spray of the fuel injected from said fuel injection mechanism strikes,
    a piston pin boss provided at a back end of said piston, the piston pin boss having a hole through which a piston pin for coupling said piston to a connecting rod is inserted, and
    a thickness-reduction portion provided at the back end of said piston and adjacent to said piston pin boss, a thickness-reduction amount of said thickness-reduction portion being set in correspondence with a position of said cavity, the thickness-reduction portion comprising a first thickness-reduction section under the cavity and a second thickness-reduction section not under the cavity, the thickness-reduction amount of the first thickness-reduction section being different from the thickness-reduction amount of the second thickness-reduction section.

2. The piston for an internal combustion engine according to claim 1, wherein
    said thickness-reduction amount of the first thickness-reduction section is smaller than said thickness-reduction amount of said second thickness-reduction section.

3. The piston for an internal combustion engine according to claim 1, wherein
    said thickness-reduction portion has a curved surface that is smoothly formed.

4. The piston for an internal combustion engine according to claim 1, wherein
    the thickness-reduction amount of said thickness-reduction portion is set so that weight is equally balanced between a thrust direction and an opposite-thrust direction.

5. The piston for an internal combustion engine according to claim 1, wherein
    the position of said cavity is displaced from center of said piston.

6. The piston for an internal combustion engine according to claim 1, wherein the thickness-reduction portion further comprises:
    a third thickness-reduction section not under the cavity and positioned opposite to the second thickness-reduction section,
    a fourth thickness-reduction section not under the cavity and adjacent the third thickness-reduction section, the thickness-reduction amount of the fourth thickness-reduction section being less than the thickness-reduction amount of the third thickness-reduction section.

* * * * *